(12) United States Patent
Turner et al.

(10) Patent No.: US 8,833,777 B2
(45) Date of Patent: Sep. 16, 2014

(54) COMBINATION SCOOTER AND MESSENGER BAG

(76) Inventors: Michael Hughesdon Turner, Arlington, VA (US); Ryan Patrick Murphy, Redondo Beach, CA (US)

( * ) Notice: Subject to any disclaimer, the term of this patent is extended or adjusted under 35 U.S.C. 154(b) by 51 days.

(21) Appl. No.: 12/929,670

(22) Filed: Feb. 7, 2011

(65) Prior Publication Data

US 2011/0193304 A1   Aug. 11, 2011

Related U.S. Application Data

(60) Provisional application No. 61/282,421, filed on Feb. 5, 2010.

(51) Int. Cl.
| | | |
|---|---|---|
| *B62B 3/02* | (2006.01) | |
| *B62B 3/00* | (2006.01) | |
| *B62J 7/06* | (2006.01) | |
| *B62B 5/00* | (2006.01) | |
| *B62K 15/00* | (2006.01) | |
| *B62K 3/00* | (2006.01) | |
| *B62B 5/08* | (2006.01) | |

(52) U.S. Cl.
CPC ........... *B62B 5/0023* (2013.01); *B62B 2202/24* (2013.01); *B62B 3/009* (2013.01); *B62J 7/06* (2013.01); *B62B 5/0026* (2013.01); *B62B 3/02* (2013.01); *B62K 15/006* (2013.01); *B62B 2206/006* (2013.01); *B62K 3/002* (2013.01); *B62B 5/087* (2013.01)
USPC .......................................................... 280/37

(58) Field of Classification Search
CPC ........ B62B 3/009; B62B 3/02; B62B 5/0023; B62B 5/0026; B62B 5/087; B62B 2202/24; B62B 2206/006; B62K 15/006; B62K 3/002

USPC ..................................... 280/37, 30; 190/18 A
See application file for complete search history.

(56) References Cited

U.S. PATENT DOCUMENTS

| | | |
|---|---|---|
| 3,314,494 A | 4/1967 | Weitzner |
| 3,413,011 A | 11/1968 | Weitzner |
| 3,917,038 A | 11/1975 | Foge et al. |
| 4,145,065 A | 3/1979 | Kupka |
| 4,254,850 A | 3/1981 | Knowles |
| 4,273,222 A | 6/1981 | Cassimally et al. |
| 4,368,835 A | 1/1983 | Murphy |
| D268,938 S | 5/1983 | Carmagola et al. |
| 4,586,721 A | 5/1986 | Harada et al. |
| D295,990 S | 5/1988 | Hanna et al. |
| 4,845,804 A | 7/1989 | Garrett |
| 4,913,252 A | 4/1990 | Bartley et al. |

(Continued)

*Primary Examiner* — J. Allen Shriver, II
*Assistant Examiner* — Brian Cassidy

(57) ABSTRACT

The combination scooter and messenger bag is an article-carrying device that can be converted into a wheeled land vehicle. When used as an article carrying device, the invention resembles a conventional messenger bag with a single strap. This is known as "carrying mode." When used as a wheeled land vehicle, the invention resembles a kick scooter. This is known as "riding mode." The invention employs a mechanism that quickly and easily converts the combination scooter and messenger bag from "carrying mode" to "riding mode" and vice versa. Raising the handlebar shifts the messenger bag from on top of the footboard to the side of the footboard. Lowering the handlebar shifts the messenger bag in the apposite direction. In this way, the scooter footboard is largely hidden from view in "carrying mode" and exposed for a user to stand upon in "riding mode."

16 Claims, 8 Drawing Sheets

(56) References Cited

U.S. PATENT DOCUMENTS

| | | |
|---|---|---|
| 5,228,706 A | 7/1993 | Boville |
| 5,374,073 A | 12/1994 | Hung-Hsin |
| 5,433,461 A * | 7/1995 | Chang .............................. 280/37 |
| 5,533,231 A | 7/1996 | Bai |
| 5,709,400 A | 1/1998 | Bonnier et al. |
| 5,749,446 A * | 5/1998 | Hsieh ........................... 190/107 |
| 5,813,503 A | 9/1998 | Chang |
| 5,820,146 A | 10/1998 | Van Ligten |
| 5,984,326 A | 11/1999 | Abraham et al. |
| 6,182,981 B1 | 2/2001 | Kuo |
| 6,289,554 B1 | 9/2001 | Wang |
| 6,315,307 B1 | 11/2001 | Chen et al. |
| 6,367,602 B1 | 4/2002 | Chang |
| 6,425,589 B1 | 7/2002 | Wu |
| 6,446,987 B2 | 9/2002 | Abraham et al. |
| 6,460,866 B1 | 10/2002 | Altschul et al. |
| 6,478,315 B1 | 11/2002 | Manesis |
| 6,497,311 B2 | 12/2002 | Tiramani et al. |
| 6,604,615 B2 | 8/2003 | Wu |
| 6,688,614 B2 | 2/2004 | Hsu |
| 7,029,015 B2 | 4/2006 | Lin |
| 7,036,641 B2 * | 5/2006 | Russo et al. ................. 190/18 A |
| 7,066,311 B2 | 6/2006 | O'Shea |
| 7,134,677 B2 * | 11/2006 | Opsvik .................... 280/87.041 |
| 7,237,660 B2 | 7/2007 | Wu |
| 7,389,997 B2 | 6/2008 | Johnson et al. |
| 7,431,311 B2 | 10/2008 | Turner et al. |
| 7,503,439 B2 | 3/2009 | O'shea et al. |
| 7,731,204 B2 * | 6/2010 | Turner et al. .................... 280/30 |
| 8,201,837 B2 * | 6/2012 | Dweek ............................ 280/30 |
| 2002/0162716 A1 | 11/2002 | Fabritz |
| 2004/0056442 A1 | 3/2004 | Ostrowski et al. |
| 2004/0094919 A1 | 5/2004 | Roder et al. |
| 2004/0238303 A1 | 12/2004 | Hafif |
| 2011/0089650 A1 * | 4/2011 | Dweck ............................ 280/30 |

* cited by examiner

FIG. 1a
FIG. 1b
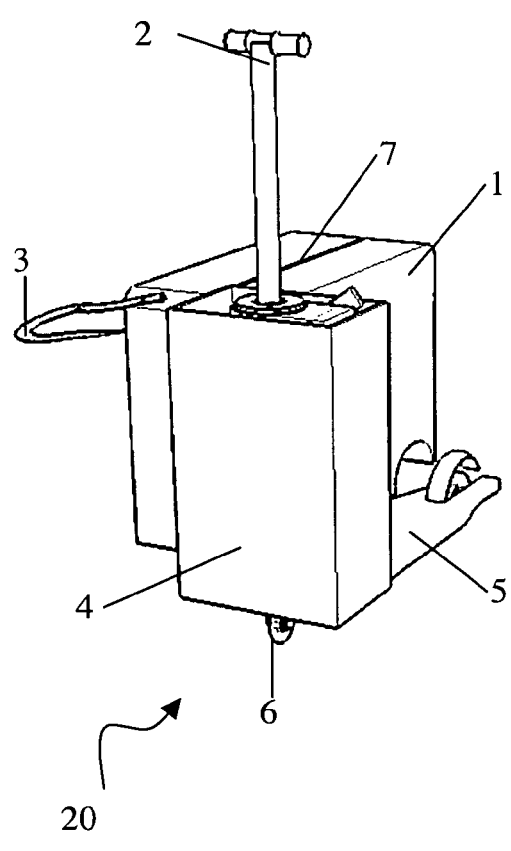
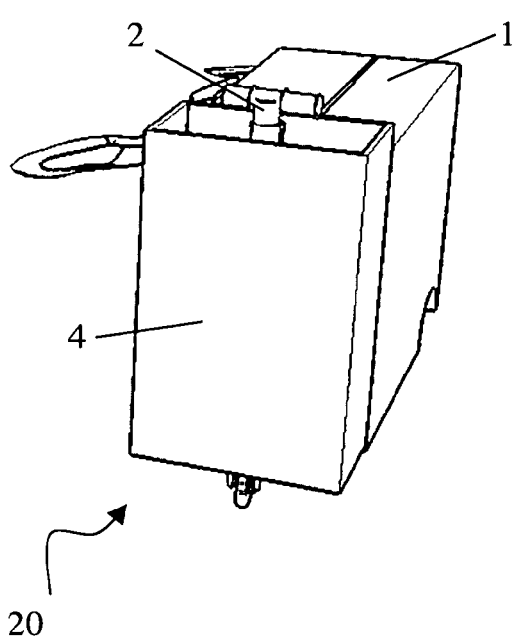

FIG. 3a
FIG. 3b
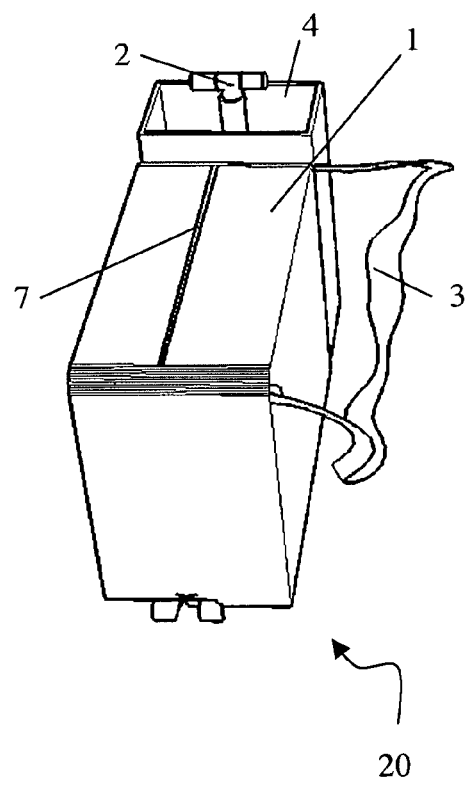
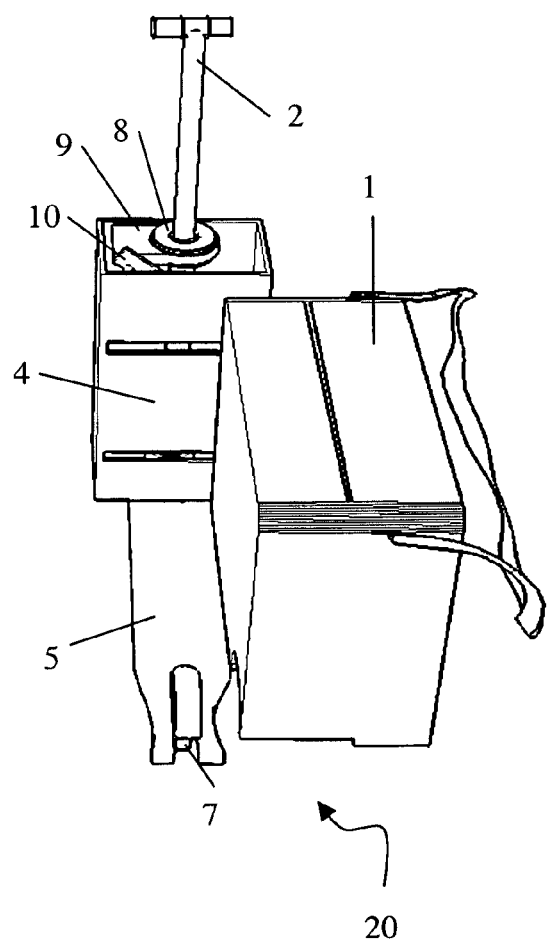

FIG. 4a
FIG. 4b
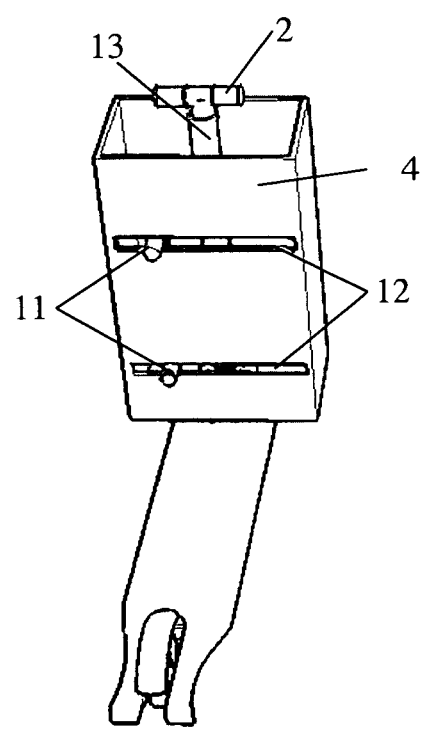
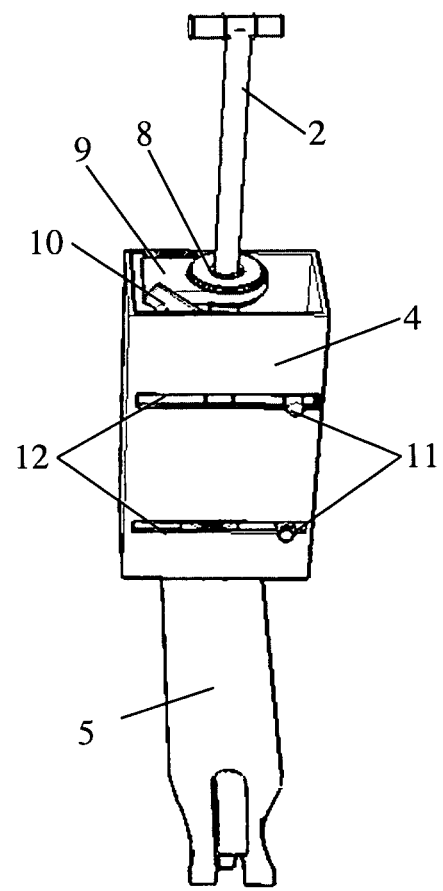

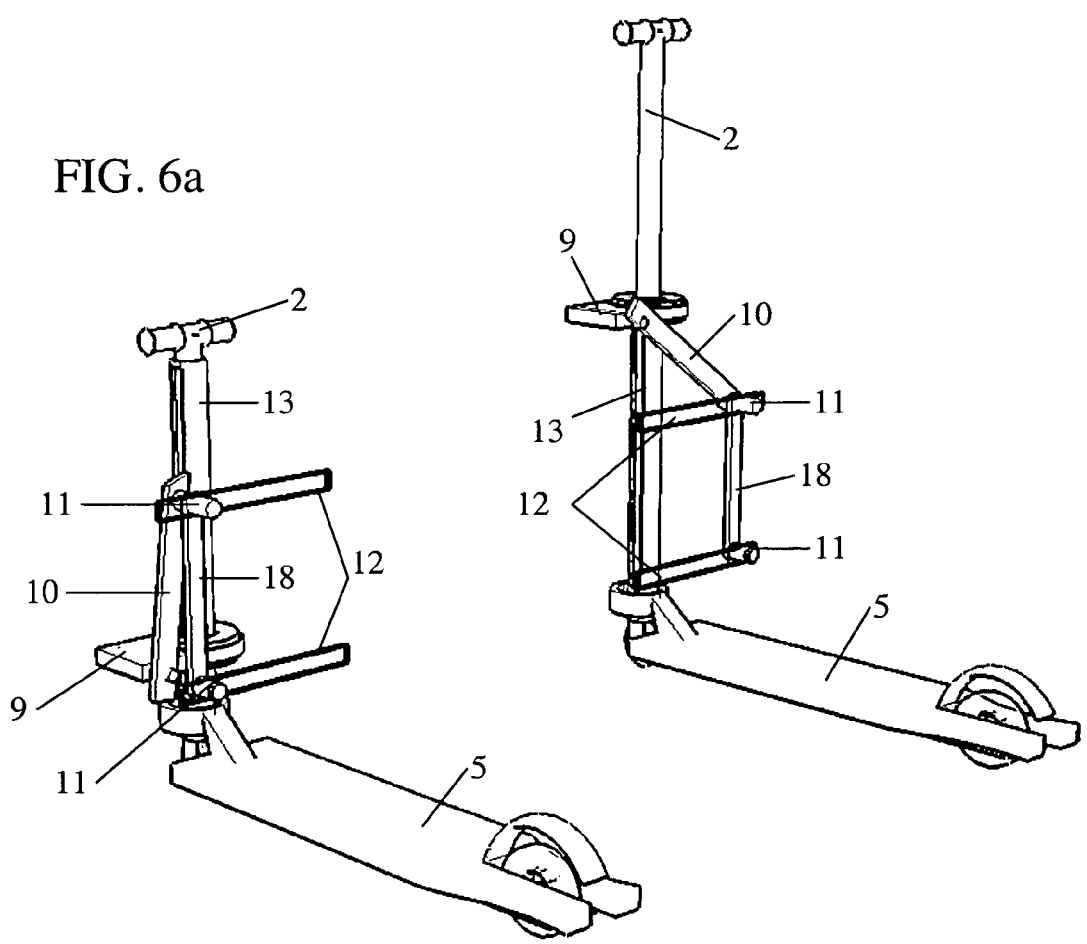

COMBINATION SCOOTER AND MESSENGER BAG

CROSS-REFERENCE TO RELATED APPLICATIONS

This application claims priority from U.S. Provisional Application No. 61/282,421, filed Feb. 5, 2010, entitled Combination Scooter/Messenger Bag, the disclosure of which is herein incorporated by reference.

FIELD OF THE INVENTION

The present invention relates to land vehicle combined with an article carrying device, and more particularly to a scooter-type vehicle and messenger bag-type article carrying device, where the scooter is quickly convertible between in-use and non-use positions.

BACKGROUND OF THE INVENTION

Numerous kick scooters have been developed that roll on two wheels and, in some cases, allow the user to fold the scooter in half saving storage space when the scooter is not in use. These scooters are primarily intended for recreational use although they can be also used for regular commuting by pedestrians and public transportation riders. These scooters have also been equipped with electric motors allowing for powered movement instead of a manual push, or kick, with the user's foot. While these scooters are generally useful vehicles for traveling distances and having fun, they lack the ability to help the user support whatever items the user might be carrying. This forces the user to wear some type of article carrying device in order to carry their belongings with them as they travel on the scooter. Typically, these article carrying devices take the form of shopping bags or backpacks and are held in the user's hand while holding on to the scooters handlebars, or they are worn on the user's shoulders. Grasping a bag handle while holding on to the handlebar of a scooter is dangerous and impairs a user's ability to properly steer the scooter. Wearing a backpack while scooting can increase the stress on the user's shoulders and back as she operates the scooter.

Pedestrians and public transportation users also use rolling luggage to carry their belongings while walking. These types of luggage have hard and soft cases and come in many styles including large and small suitcases and backpacks, and messenger bags. They roll behind as the user walks in front. While they do prevent the user from back and shoulder stress caused by carrying luggage, they are difficult to walk quickly with and to use in crowded situations.

There have been many attempts to combine a kick scooter with an article carrying device to avoid the shortcomings of each product on its own, as described above. Examples include, U.S. Pat. Nos. 6,460,866; 4,913,252; and 3,314,494. With these versions the scooter footboard is configured to rotate, or fold, between in-use and non-use positions. When in use, the footboard extends out, or is unfolded, from the article carrying device. Conversely, when not in use, the footboard lies vertically along a similarly dimensioned face of the article carrying device, or is folded up. This can be seen in U.S. Pat. No. 6,460,866. This is done to minimize the exposure of the footboard to external elements and avoid potential snagging problems, while maintaining a compact and clean look to the device as a whole. Additionally, the automatic deployment mechanisms of U.S. Pat. Nos. 7,431,311 and 7,731,204, herein incorporated by reference, adds greatly to the convenience and speed of converting the scooter footboard between use and non-use, linking handlebar movement to automatic movement of the footboard.

However, these styles of article carrying devices combined with scooters are not amenable to a messenger-style bag, in that there is no vertical face on a messenger-style bag to accommodate the vertically positioned scooter footboard. Consequently, the footboard tends to stick out beyond the face of the messenger-style article carrying device and the dual goals of minimizing exposure and a compact look is not achieved. Also, these styles of article carrying devices depend on an arrangement in which the footboard is permitted to fold. Many scooters do no permit such folding in favor of overall scooter stability. As such these styles of article carrying devices and automatic folding mechanisms are incompatible with a scooter whose footboard cannot fold.

Additionally, some attempts have been made to incorporate scooters into messenger-style bags or article carrying devices shaped similarly to messenger-style bags. An example of such an attempt is U.S. Publication No. 2004/0094919 and U.S. Pat. No. 6,688,614. However, these versions do not incorporate an automatic deployment mechanism as would be greatly beneficial to combination article carrying devices and scooters, and due to the arrangement of their elements, it is not immediately clear how such a mechanism would be incorporated into them.

Thus, there is a substantial need for a combination article carrying device and scooter that incorporates an automatic deployment feature and is particularly suited for a messenger-style bag and/or a scooter that is incapable of folding up.

SUMMARY OF THE INVENTION

In accordance with one aspect of the present invention there is provided a combination scooter and messenger bag with an automatic deployment mechanism. Preferably, the combination scooter and messenger bag includes a scooter with at least two wheels and a footboard that directly or indirectly connects the two wheels. The scooter also includes a vertically oriented handlebar suitable for gripping and steering of the scooter by the user, and a housing that surrounds a portion of the vertically oriented handlebar. Preferably, the handlebar is allowed to translate vertically within the housing between raised and lowered positions. Furthermore a collar element is attached to the handlebar and moves with the handlebar during vertical translation. This collar element is pivotally attached to a proximal end of a linkage element which include a perpendicular extension on its distal end. The collar element and the linkage element are preferably contained within the housing the housing. The perpendicular extensions of the linkage element are contained within horizontal slots in a face of the housing. Preferably, the handlebar, collar element, linkage element, perpendicular extensions, and housing are arranged to convert vertical translational movement of the handlebar into horizontal translational movement of the perpendicular extensions within the slots of the housing.

Additionally, a messenger-style bag is either fixedly or removably attached to the perpendicular extensions and resides outside of the housing. The messenger-style bag is preferably located above the top face of the footboard when in a first position and to the side of the top face of the footboard when in a second position. It is the object of this invention to create a mechanism to cause the messenger-style bag to change between positions when the user moves the handlebar between raised and lowered positions.

The above described features function together to provide: a spacious flexible container with a strap, a comfortably distributed load when the device is carried with the strap, a balanced two-wheeled ride upon a scooter, a weightless and stress-free carrying of personal belongings, a faster than walking means of locomotion, a practical and simple steering mechanism, a selectively separable board and bag, convenient and continual access to both said bag and scooter simultaneously, an organized aesthetic appearance during use in either mode, and a unique and expeditious "carrying mode" to "riding mode" conversion process.

BRIEF DESCRIPTION OF THE DRAWINGS

FIG. 1a is a perspective view of the invention in the scooter mode.

FIG. 1b is a perspective view of the invention in backpack mode.

FIG. 3a is a top view of the invention in backpack mode.

FIG. 3b is a top view of the invention in scooter mode.

FIG. 4a is a top view of the invention in backpack mode, with the carrier removed.

FIG. 4b is a top view of the invention in scooter mode, with the carrier removed.

FIG. 6a is a side view of the invention in backpack mode, with the carrier and the rigid frame removed.

FIG. 6b is a side view of the invention in scooter mode, with the carrier and the rigid frame removed.

DESCRIPTION OF INVENTION

Figures 2A, 2B:
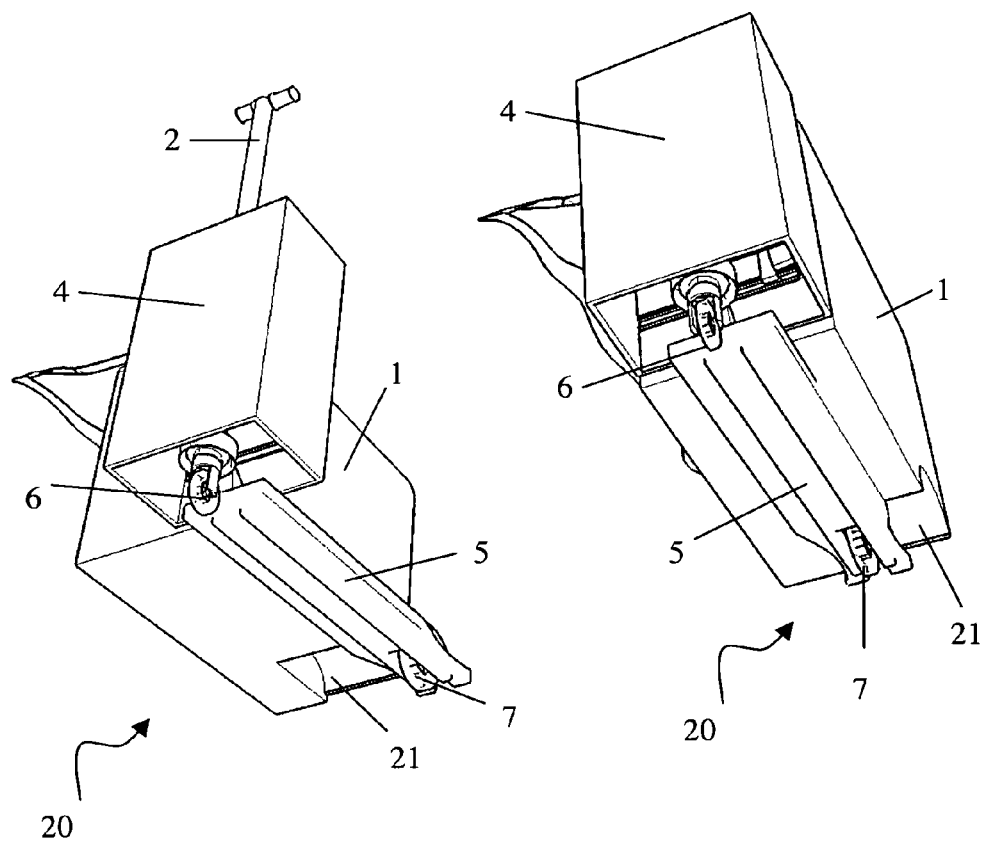
FIG. 2a is a bottom view of the invention in scooter mode.
FIG. 2b is a bottom view of the invention in backpack mode.

A combination scooter and messenger bag 20 in accordance with the present invention is illustrated in FIGS. 1a and 1b and is provided with at least two modes of transportation. The first mode is known as "carrying mode", while the second mode is "riding mode." When in "carrying mode" the invention is intended to be carried by a user via strap 3. When in "riding mode" the invention is intended to be ridden as a typical kick scooter, where the user stands upon a footboard 5 with one foot and pushes against the ground with the other creating propulsion.

The combination scooter and messenger bag 20 generally consists of a carrier 1, handlebar 2, housing 4, and footboard 5. The carrier 1 preferably is a messenger-style bag having a relatively planar shape, greater longitudinal and height dimensions, and a lesser width dimension, as is common in the art. The carrier preferably has a single carrying strap 3, although more than one strap may be employed. The carrier further has at least one aperture (not shown) which may be opened or closed with a fastener 7. In a preferred embodiment fastener 7 is a zipper but may be another type of fastener as is known in the art such as hook-and-loop fasteners, buttons, or snaps. Housing 4 is preferably fixed to footboard 5.

FIG. 1a shows the combination scooter and messenger bag 20 in "riding mode", where it is intended to be ridden by a user as a scooter-type vehicle. Handlebar 2 is configured to translate vertically between raised and lowered positions. In FIG. 1a handlebar 2 is in a raised position and extends substantially above the housing 4, although a lowermost portion of handlebar 2 remains within a compartment created by housing 4. Housing 4 is preferably made of rigid material, such as ABS plastic, or other such relatively inflexible materials. Carrier 1 is located laterally with respect to the top face of footboard 5 and therefore exposes the footboard 5 allowing a user to stand on top of footboard 5 and operate the combination scooter and messenger bag 20 as a scooter. Handlebar 2 extends to such a height as to allow the user to comfortably grasp it and steer the combination scooter and messenger bag 20 as it is ridden.

FIG. 1b shows the combination scooter and messenger bag 20 in "carrying mode", where it is intended to be manually carried by a user via strap 3. Here, handlebar 2 is in a lowered position and resides substantially within the compartment created by housing 4. Carrier 1 is located directly above yet unconnected to footboard 5 in this position, allowing relative movement between those elements. In this position, footboard 5 is effectively concealed and the user is prevented from placing their foot thereupon to use the combination scooter and messenger bag 20 as a scooter. However, due to the concealment of footboard 5 and the lowered position of handlebar 2, those elements' profiles are minimized and the likelihood that they will snag or interfere with obstacles in the environment is minimized while the invention is in "carrying mode". Additionally, a front face of the carrier 1 is adjacent yet unconnected to housing 4, allowing relative movement between those elements.

FIGS. 2a and 2b show a bottom view of the present invention. In FIG. 2a the invention is in "riding mode" and in FIG. 2b the invention is in "carrying mode." Footboard 5 is generally connected to at least one front wheel 6 and one rear wheel 7 located at opposite ends of footboard 5, as is common in the art. Front wheel 6 is located substantially beneath housing 4 and is permitted to contact the ground. Rear wheel 7 is located generally below carrier 1 at all times, and may optionally reside within a recess 21 of carrier 1 when the invention is in "carrying mode." This can be seen in FIG. 2b. Both front wheel 6 and rear wheel 7 support the invention during "riding mode" and allow the invention to roll along the ground.

FIGS. 3a and 3b show a top view of the present invention. In FIG. 3a the invention is in "carrying mode" and in FIG. 3b the invention is in "riding mode." FIG. 3b shows further details of housing 4 and the inventive mechanism that converts vertical translational movement of handlebar 2 into horizontal translational movement of carrier 1. Here, collar 8 can be seen attached to a lower portion of handlebar 2, which is in the raised position. At this position, collar 8 resides substantially within the compartment created by housing 4, but is located near the top portion of housing 4. Preferably, collar 8 is fixedly attached to handlebar 2 in a vertical direction, so as prevent relative translational movement between the two elements. Optionally, collar 8 may be a rotatable bearing-type device that permits relative rotation between handlebar 2 and collar 8, while still preventing relative translational movement. This is preferable when handlebar 2 is configured to rotate along its longitudinal axis to effectuate steering of the combination scooter and messenger bag 20, although such a steering configuration is not a requisite element of the present invention.

As can also be seen in FIG. 3b, collar 8 forms a portion of platform 9. Platform 9 connects collar 8 to a linkage element 10. The connection between platform 9 and linkage element 10 is pivotal in nature and will be discussed in more detail below. In the preferred embodiment, platform 9 is substantially planar and lies within compartment created by housing 4 at the same vertical positions of collar 8.

FIGS. 4a and 4b show a top view of the present invention with the carrier 1 removed from view for clarity purposes. In FIG. 4a the invention is in "carrying mode" and in FIG. 4b the invention is in "riding mode." These Figures show further detail of housing 4. Housing 4 contains at least one horizontal slot 12. A carrier stud 11 is connected to one end of linkage element 10, which is not shown in FIG. 4a but visible in FIG. 4b. Carrier stud 11 projects through slot 12 and connects to carrier 1 (not shown) and is allowed to move horizontally within slot 12. This movement may be of a sliding nature if carrier stud 11 is fixedly attached to one end of linkage element 10 or may be of a rolling nature if carrier stud 11 is pivotally attached to linkage element 10. Furthermore, carrier stud 11 may be permanently attached to carrier 1 but is preferably releasable to allow separation of carrier 1 for repairs or alteration, or for standalone use. In FIG. 4a carrier stud 11 is located at one end of slot 12 and in FIG. 4b carrier stud 11 is located at an opposite end of slot 12. The process by which carrier stud 11 moves across slot 12 will be discussed in detail hereafter.

FIGS. 5a-5e show how the vertical movement handlebar 2 causes horizontal movement of carrier stud 11 within slot 12 through platform 9 and linkage element 10. The user would carry out this operation when it is desired to convert the invention from "carrying mode" to "riding mode." In FIG. 5a, the invention is in "carrying mode" and handlebar 2 is in the lower-most position within housing 4. Although not shown, carrier 1 is located in front of housing 4 in this position. Additionally, platform 9 is also at its lowest point as it is fixed to handlebar 2 in a vertical fashion. Linkage element 10 extends upwards since it is connected to carrier stud 11, which is at all times contained within slot 12 of housing 4. At this position, carrier stud 11 is located proximate to one extreme end of slot 12.

Figure 5A:
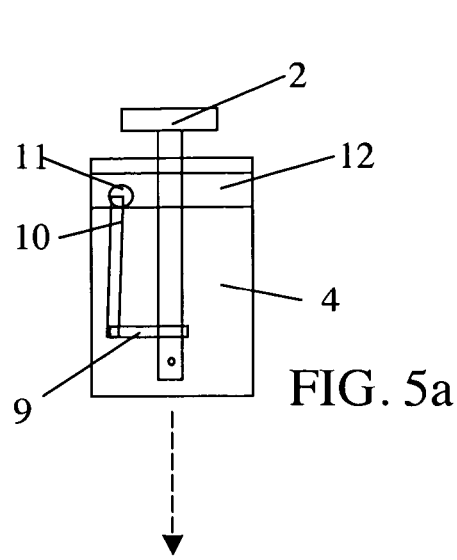
FIGS. 5a-5e are rear views of the basic motion of the slide mechanism in relation to handlebar movement.
Figure 5E:
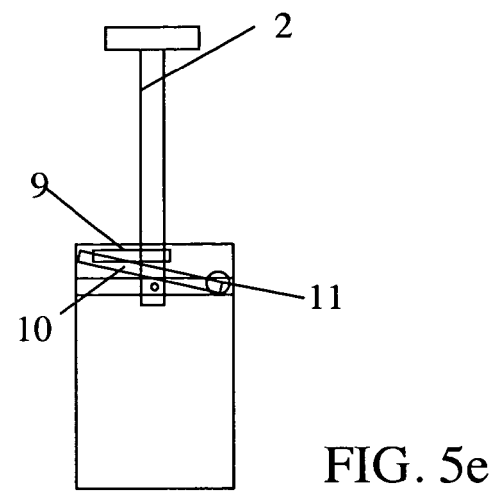
Figure 5B:
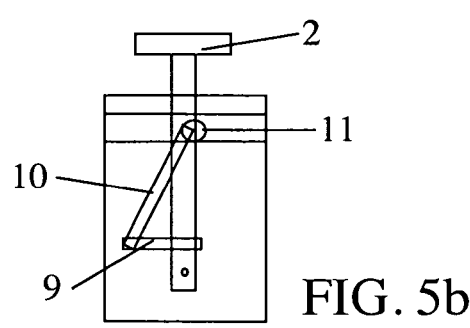

When the user raises handlebar 2 to the position indicated in FIG. 5b, platform 9 is also raised. Due to the rigid nature of linkage element 10, carrier stud 11 is consequently forced to move horizontally along slot 12 to a position closer to the midpoint of slot 12. Platform 9 remains below slot 12 in this position. In FIG. 5c, the user further raises handlebar 2 and due to the rise in the vertical position of platform 9, carrier stud 11 travels past the midpoint of slot 12 and proceeds towards the opposite end of slot 12 from where it began.

Figure 5D:
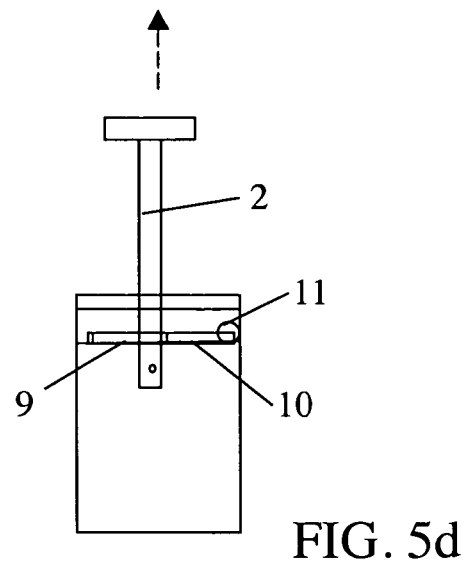
Figure 5C:
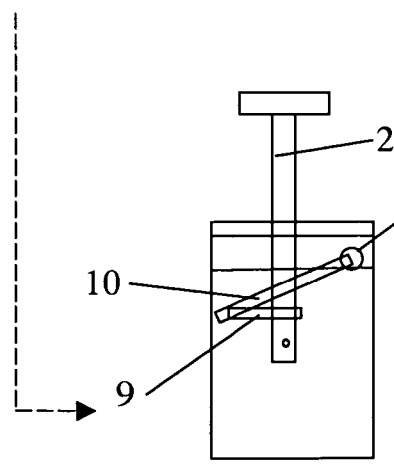

In FIG. 5d, handlebar 2 is raised slightly further and platform 9 reaches approximately the same vertical position of slot 12 within housing 4. This causes linkage element 10 to be in a substantially horizontal orientation, and as a result, carrier stud 11 reaches the opposite end of slot 12 from where it began. Although the carrier 1 is not shown in FIG. 5d, it is at its extreme lateral position with respect to housing 4 due to its connection to carrier stud 11. In effect, carrier 1 moves laterally as carrier stud 11 moves laterally within slot 12. In FIG. 5e, handlebar 2 is further raised to its upper-most position. Platform 9 rises above slot 12 and, as a result, carrier stud 11 moves from the extreme end of slot 12 back towards to the midpoint of slot 12. The invention is now in "riding mode." The retreat of carrier stud 11 from the extreme end of slot 12 before arriving in the "riding mode" position is useful for increasing the stability of carrier 1 during use of the invention as a scooter.

Handlebar 2 may be releasably locked (locking mechanism not shown) in the lower-most and upper-most positions to secure the combination scooter and messenger bag 2 in either "carrying mode" or "riding mode" respectively. Such a locking mechanism may include a spring-loaded button or quick release clamp as is common in the art of telescoping scooter handlebars. While FIGS. 5a-5e demonstrate the process of converting from "carrying mode" to "riding mode", the user need simply lower the handlebar 2 from the position in FIG. 5e to the position in FIG. 5a, which results in the opposite movement of platform 9, linkage element 10, and carrier stud 11 to convert the invention from "riding mode" to "carrying mode." In summary, carrier 1 travels horizontally with carrier stud 11 across slot 12, when handlebar 2 is raised or lowered.

FIGS. 6a and 6b show a perspective view of the present invention with both the carrier 1 and housing 4 removed from view for clarity purposes. Slots 12 are shown in FIGS. 6a and 6b for clarification purposes, but are integrally part of housing 4, which is removed for present illustrative purposes. Here, handlebar 2 is located within column member 13 and is permitted to slide longitudinally relative to column 13 in a telescoping fashion, as is common in the art of scooter handlebars. Platform 9 is connected to handlebar 2, as will be detailed further below, and slides along the outside of column 13 as handlebar 2 is raised and lowered. Platform 9 is further pivotally connected to linkage element 10 at one end of linkage element 10. Linkage element 10 is contains a carrier stud 11 at its opposite end from the connection to platform 9.

Figure 7:
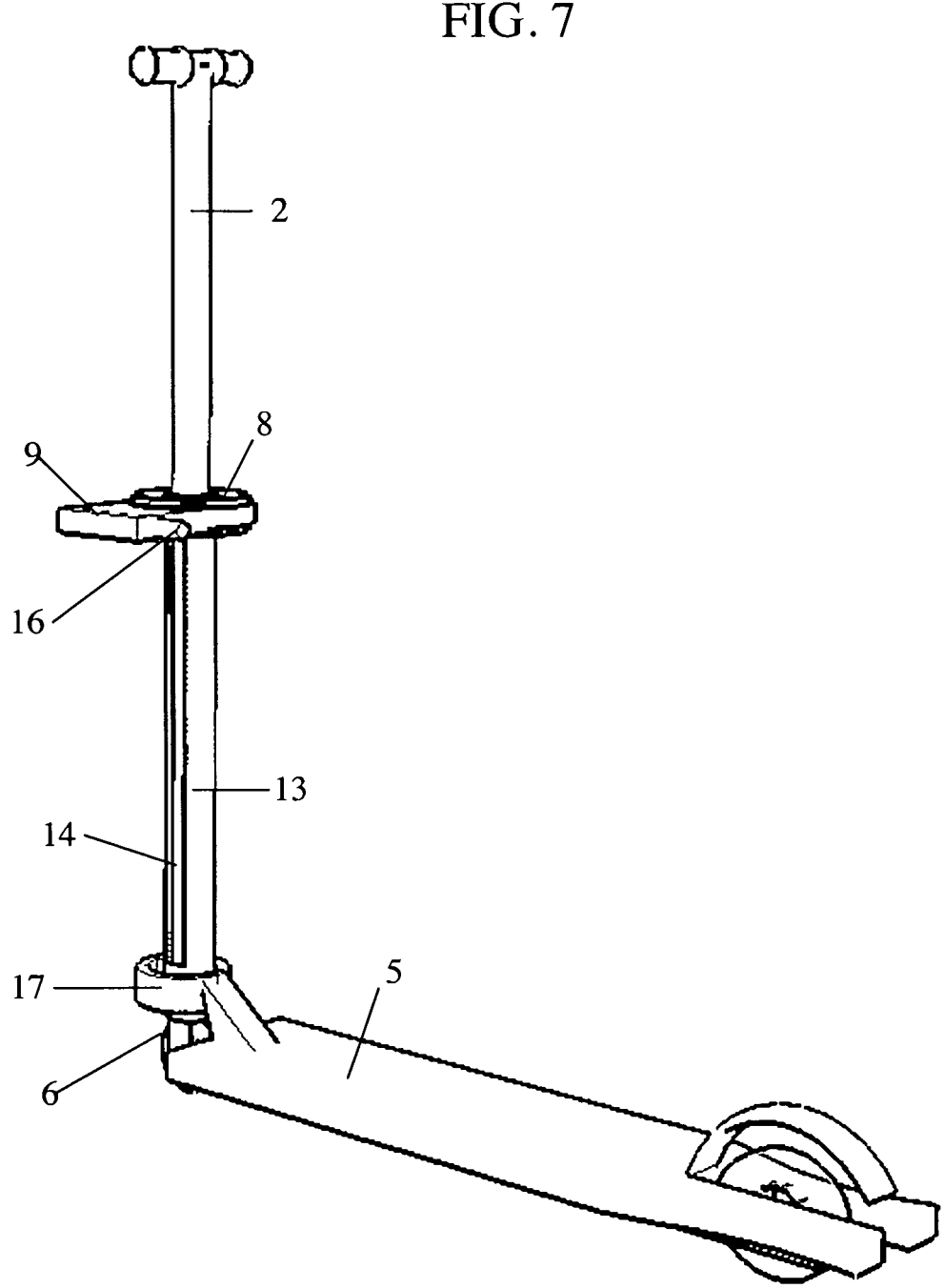
FIG. 7 is a perspective view of the collar that connects to the inner cylinder.

In a preferred embodiment of the invention, there are at least two carrier studs 11 each of which resides within a separate slot 12. Slots 12 are located at two different vertical positions within housing 4 (not shown). Multiple slots 12 and multiple carrier studs 11 increase the stability of carrier 1 during conversions between "riding mode" and "carrying mode" as well as during use of the invention in both "riding mode" and "carrying mode." When there are multiple carrier studs 11, as shown in FIGS. 6a and 6b, an additional crossbar 18 is used to connect the carrier studs 11 together, preventing the carrier studs 11 from moving relative to each other. In other words, due to the fixation of slots 12 within housing 4, crossbar 18 ensures the carrier studs 11 move simultaneously at all times. Note that multiple slots 12 and multiple carrier studs 11 are described for illustrative purposes but are not intended as limiting features of the present invention FIG. 7 shows a detailed view of the arrangement between handlebar 2 and column member 13, and front wheel 6. As detailed above, platform 9 is connected to handlebar 2 so that vertical movement of handlebar 2 results in vertical movement of platform 9. While handlebar 2 slides vertically within column member 13, platform 9 slides vertically on the outside of column member 13. Handlebar 2 connects to platform 9 through a column slot 14 that runs along column member 13 on at least one face and for a distance that equals the total vertical travel of handlebar 2 from its lower-most to its upper-most positions. Column member 13 is fixedly attached to front wheel 6 and rotatably attached to footboard 5 at bracket 17.

In the preferred embodiment, the combination scooter and messenger bag 20 can be steered while in "riding mode" through a controlled rotation of front wheel 6. To accomplish this, a user applies a torque to handlebar 2 about the longitudinal axis of handlebar 2 and column member 13. Handlebar 2 transmits the applied torque to column member 13 through a handlebar projection 15 (shown in FIG. 8) that extends through column slot 14. The middle column 13 is fixedly connected to front wheel 6 and converts the applied torque from handlebar 2 to rotation of front wheel 6. Front wheel 6 is permitted to rotate within bracket 17 through a bearing, which is common in the scooter art. Bracket 17 is rigidly connected to footboard 5. Overall, this arrangement achieves steering of the combination scooter and messenger bag 20 by permitting rotation of handlebar 2, column member 13, and front wheel

6 with respect to footboard 5. This steering functionality is illustrative of a commonly found scooter feature but is not intended to be limiting.

Figure 8:
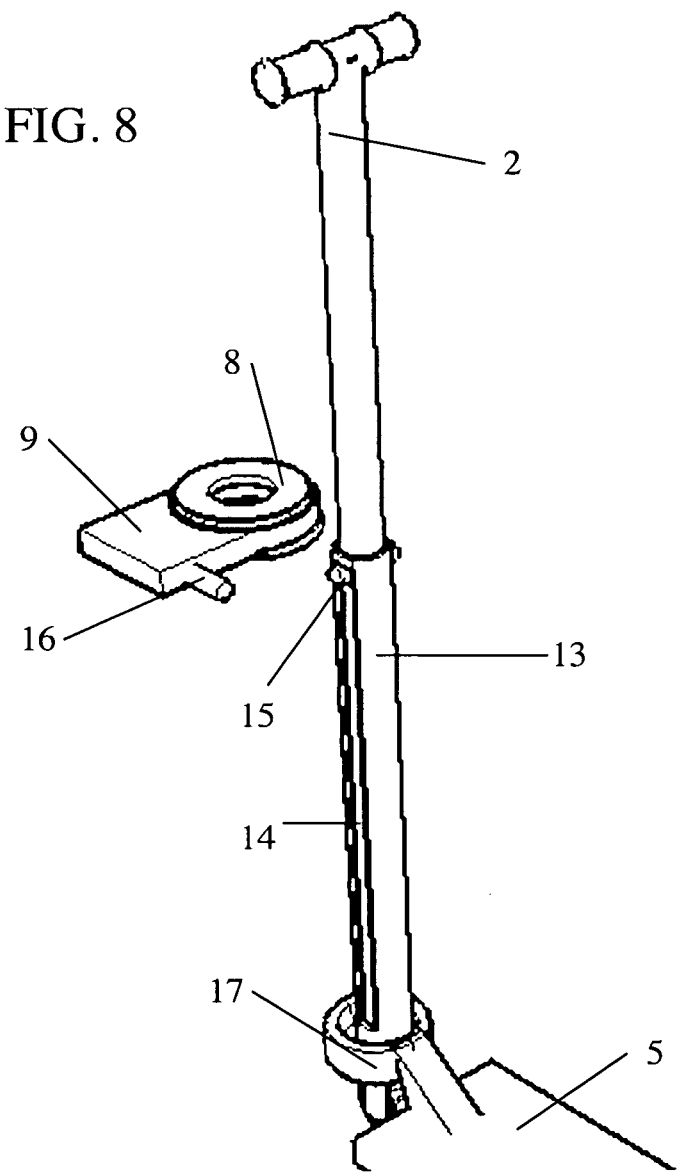
FIG. 8 is a perspective view of the collar separated from the inner cylinder.

FIG. 8 shows a platform 9 and collar 8 in isolation from handlebar 2 and column member 13. Handlebar 2 connects to collar 8 through a handlebar projection 15. Handlebar projection 15 extends through column slot 14 in column member 13 to make this connection. In the preferred embodiment in which the invention has steering functionality, collar 8 takes the form of a bearing to permit rotation of handlebar 2 with respect to platform 9. In this arrangement where collar 8 acts as a bearing, platform 9 moves vertically with handlebar 2 when it is raised or lowered but does not rotate when handlebar 2 and column member 13 rotate during steering. Again, this steering functionality is a preferred embodiment but not required for the claimed invention. In an alternate embodiment, handlebar 2, column member 13, and front wheel 6 may be incapable of rotation. In this embodiment collar 8 would cease to function as a rotatable bearing and would simply link vertical movement of handlebar 2 to vertical movement of platform 9. FIG. 8 further shows a platform projection 16, which pivotally connects platform 9 to linkage element 10 (not shown).

The invention herein as described includes various features that were presented with reference to particular embodiments. The features of one embodiment are not limited to that particular embodiment. Features may be interchangeable with other embodiments, as one with ordinary skill in the art will understand and appreciate. Although the invention herein has been described with reference to particular embodiments, they are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. A combination wheeled vehicle and article carrying device, comprising:
    an article carrier;
    a handle assembly, further comprising first and second column members, wherein said first column member is slidable within said second column member;
    a rigid frame configured to surround said handle assembly;
    a footboard;
    a first wheel and a second wheel, wherein said first wheel is located at a first end of said footboard and said second wheel is located at a second end of said footboard;
    wherein the handle assembly is attached to said footboard proximate to the first wheel;
    wherein the article carrier is attached to said handle assembly through an opening in the rigid frame;
    a mechanism attached to the handle assembly and the article carrier, the mechanism configured to move the article carrier with respect to the second column member from a first position to a second position when the first column member slides away from said second column member;
    wherein in the first position the article carrier is located proximate to the second column member and in the second position the article carrier is located away from the second column member.

2. The combination wheeled vehicle and article carrying device according to claim 1, wherein the mechanism is further configured to move the article carrier from the second position to the first position when the first column member slides towards the second column member.

3. The combination wheeled vehicle and article carrying device according to claim 1, wherein the article carrier has height and length dimensions that are substantially greater than a width dimension;
    wherein the article carrier is attached to the mechanism along a face of the article carrier that is defined by the width and height dimensions.

4. The combination wheeled vehicle and article carrying device according to claim 1, wherein the mechanism comprises a collar and a linking member;
    wherein the collar is connected to the first column member;
    wherein the linking member is pivotally connected to the collar;
    wherein the article carrier is connected to the linking member.

5. The combination wheeled vehicle and article carrying device according to claim 4, wherein the article carrier is releasably connected to the linking member.

6. The combination wheeled vehicle and article carrying device according to claim 1, wherein in the first position the article carrier is located proximate to and above the footboard and in the second position the article carrier is located away from and not above said footboard.

7. A combination wheeled vehicle and article carrying device, comprising:
    an article carrier;
    a handle assembly, further comprising first and second column members, wherein said first column member is slidable within said second column member;
    a rigid frame configured to surround said handle assembly;
    a footboard;
    a first wheel and a second wheel, wherein said first wheel is located at a first end of said footboard and said second wheel is located at a second end of said footboard;
    wherein the handle assembly is attached to said footboard proximate to the first wheel;
    wherein the article carrier is attached to said handle assembly through an opening in the rigid frame;
    a mechanism attached to the handle assembly and the article carrier, the mechanism configured to move the article carrier with respect to the second column member from a second position to a first position when the first column member slides towards said second column member;
    wherein in the first position the article carrier is located proximate to the second column member and in the second position the article carrier is located away from the second column member.

8. The combination wheeled vehicle and article carrying device according to claim 7, wherein the mechanism is further configured to move the article carrier from the first position to the second position when the first column member slides away from the second column member.

9. The combination wheeled vehicle and article carrying device according to claim 7, wherein the article carrier has height and length dimensions that are substantially greater than a width dimension;
    wherein the article carrier is attached to the mechanism along a face of the article carrier that is defined by the width and height dimensions.

10. The combination wheeled vehicle and article carrying device according to claim 7, wherein the mechanism comprises a collar and a linking member;
    wherein the collar is connected to the first column member;
    wherein the linking member is pivotally connected to the collar;

wherein the article carrier is connected to the linking member.

11. The combination wheeled vehicle and article carrying device according to claim 10, wherein the article carrier is releasably connected to the linking member.

12. The combination wheeled vehicle and article carrying device according to claim 7, wherein in the first position the article carrier is located proximate to and above the footboard and in the second position the article carrier is located away from and not above said footboard.

13. A combination wheeled vehicle and article carrying device comprising:
- an article carrier;
- a handle assembly, further comprising first and second column members, wherein said first column member is slidable within said second column member;
- a rigid frame configured to surround said handle assembly;
- a footboard;
- a first wheel and a second wheel, wherein said first wheel is located at a first end of said footboard and said second wheel is located at a second end of said footboard;
- wherein the handle assembly is attached to said footboard proximate to the first wheel;
- wherein the article carrier is attached to said handle assembly through an opening in the rigid frame;
- a mechanism attached to the handle assembly and the article carrier, the mechanism comprising a collar and a linking member;
- wherein the collar is connected to the first column member;
- wherein the linking member is pivotally connected to the collar;
- wherein the article carrier is connected to the linking member;
- wherein the mechanism is configured to move the article carrier with respect to the second column member from a first position to a second position when the first column member slides away from said second column member;
- wherein the mechanism is further configured to move the article carrier with respect to the second column member from said second position to said first position when the first column member slides towards said second column member;
- wherein in the first position the article carrier is located proximate to the second column member and in the second position the article carrier is located away from the second column member.

14. The combination wheeled vehicle and article carrying device according to claim 13, wherein the wherein the article carrier has height and length dimensions that are substantially greater than a width dimension;
- wherein the article carrier is attached to the mechanism along a face of the article carrier that is defined by the width and height dimensions.

15. The combination wheeled vehicle and article carrying device according to claim 13, wherein the article carrier is releasably connected to the linking member.

16. The combination wheeled vehicle and article carrying device according to claim 13, wherein in the first position the article carrier is located proximate to and above the footboard and in the second position the article carrier is located away from and not above said footboard.

* * * * *